July 10, 1945. A. C. LIND 2,380,116
STAPLING MECHANISM
Original Filed Sept. 22, 1941   4 Sheets-Sheet 4

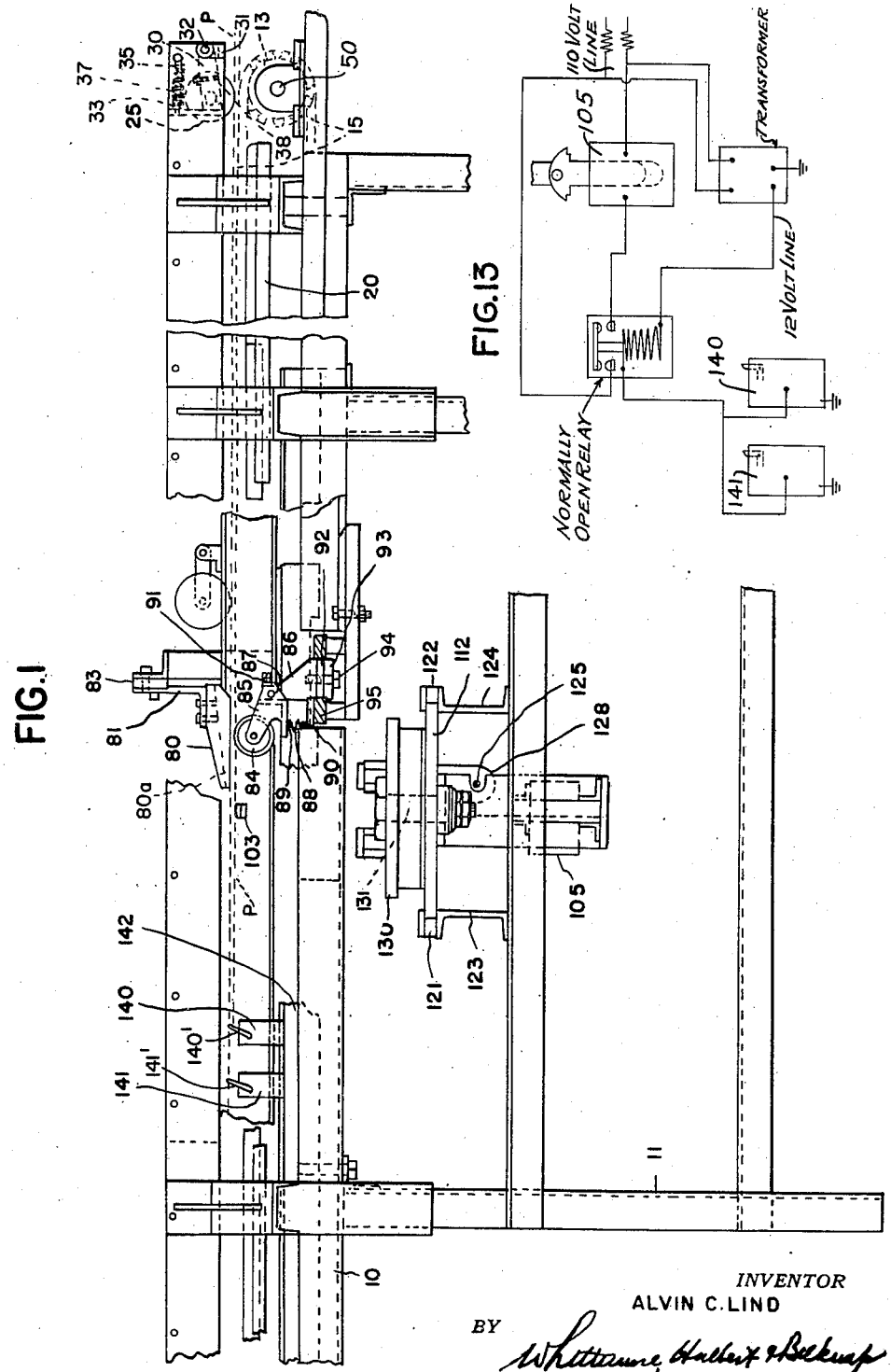

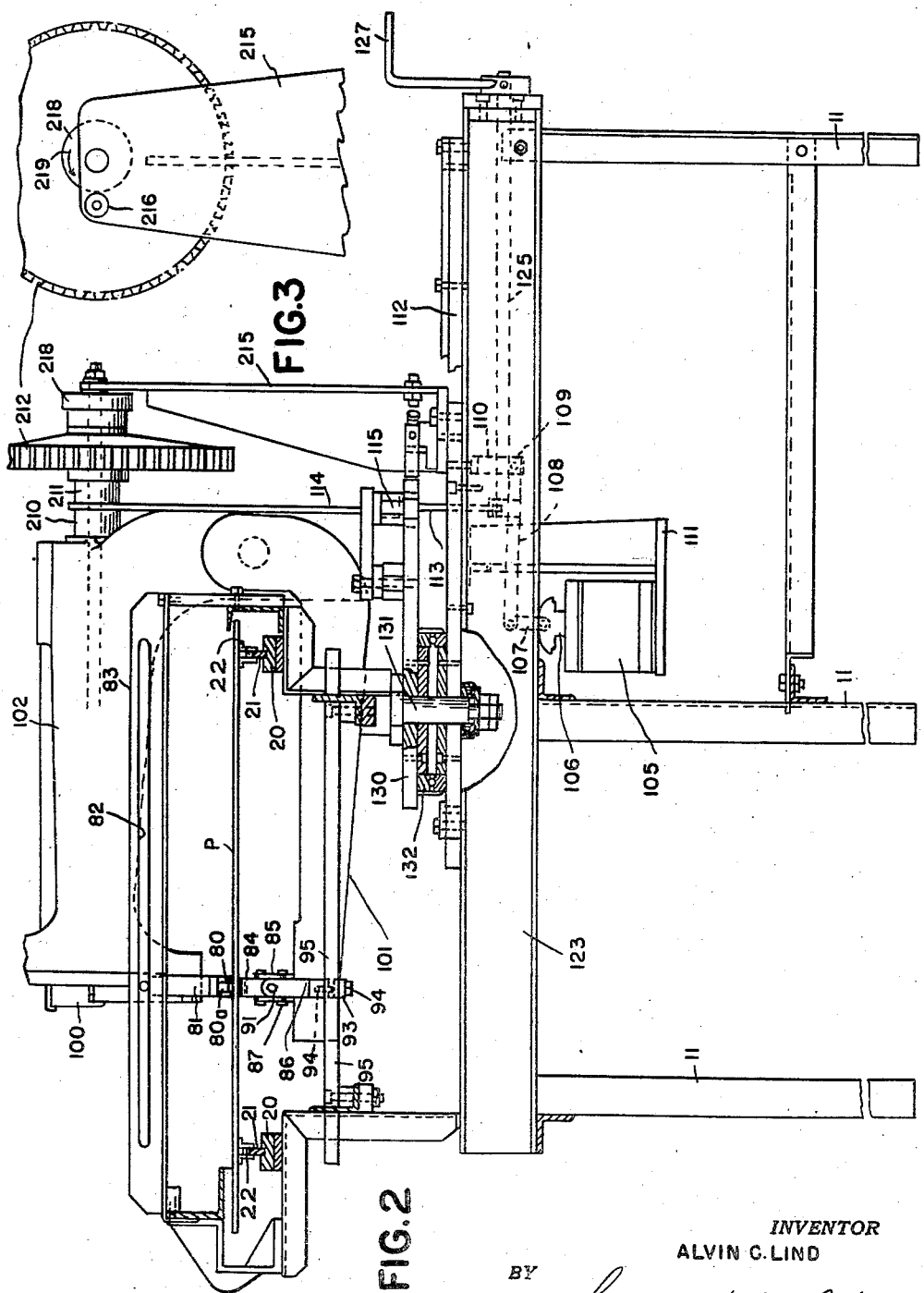

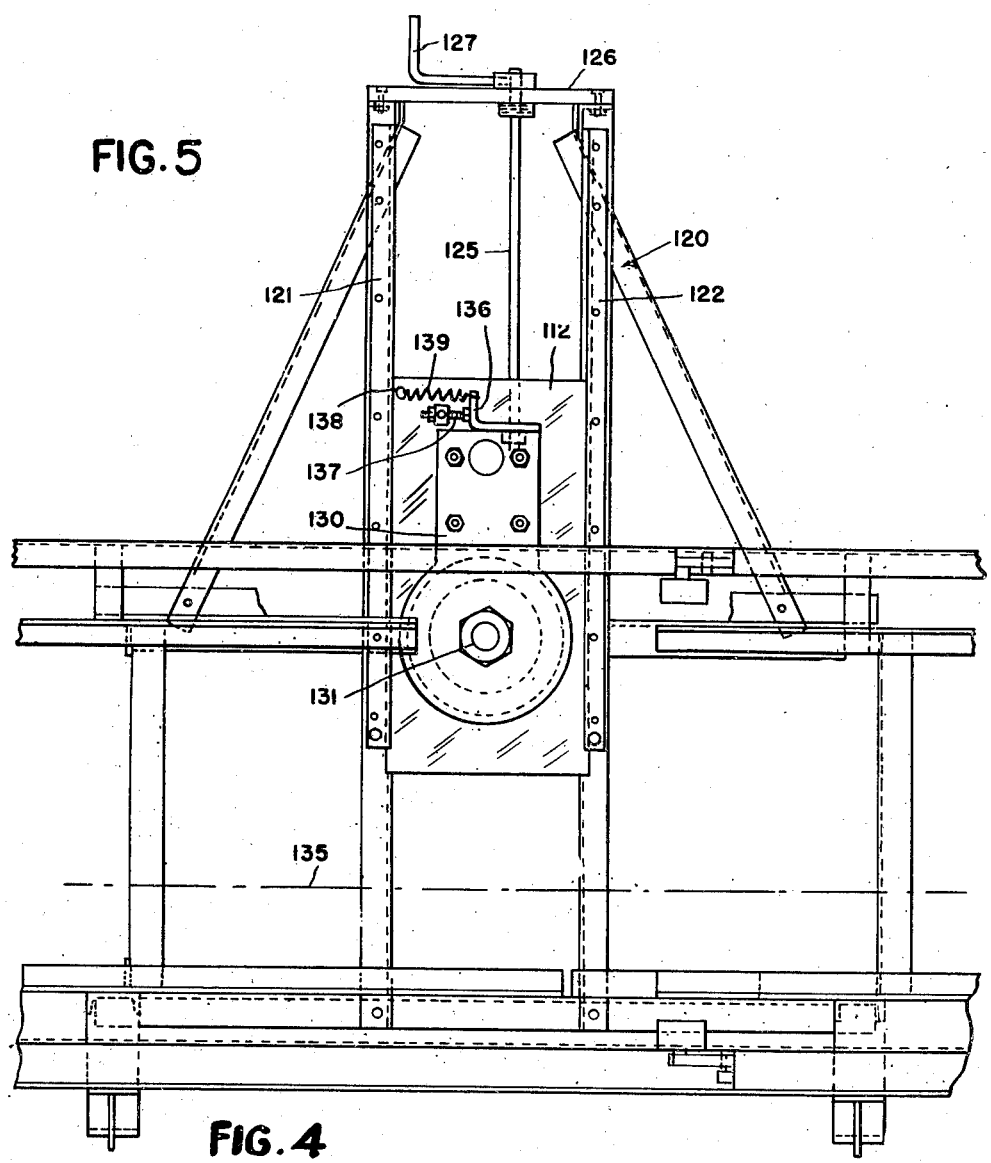
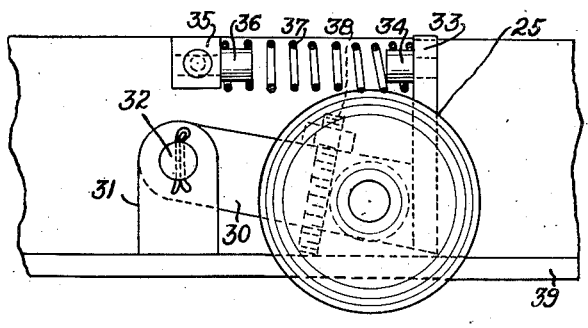

INVENTOR
ALVIN C. LIND
BY
Whittemore Hulbert & Belknap
ATTORNEYS

Patented July 10, 1945

2,380,116

UNITED STATES PATENT OFFICE 2,380,116

STAPLING MECHANISM

Alvin C. Lind, Detroit, Mich., assignor to National Automotive Fibres, Inc., Detroit, Mich., a corporation of Delaware Application March 16, 1942, Serial No. 434,958, which is a division of application Serial No. 411,940, September 22, 1941. Divided and this application September 8, 1942, Serial No. 457,666

26 Claims. (Cl. 1—2)

This invention relates generally to stapling mechanism and constitutes a division of an application filed March 16, 1942, bearing Serial No. 434,958 which is a division of an application filed September 22, 1941, bearing Serial No. 411,940.

Heretofore, a decorative effect has been imparted to interior trim panels, particularly of automotive vehicles, by providing a bead or molding strip which generally extends across the trim panel, but which may extend over any portion thereof in any desired direction. In the past these trim moldings have for the most part been formed of a bright metal, or have been chromium plated.

I have devised a new molding strip and apparatus for assembling the same with a trim panel. Briefly described, my invention comprises a base strip having laterally extending flanges, and a cover strip which is first adapted to be engaged with the base strip in registry therewith, and is then subjected to a rolling operation which bends flanges of the cover strip inwardly under the flanges of the base strip, so as to provide a definite and positive interlock between the parts.

According to the preferred embodiment of my invention the assembly of the trim panel and molding strip elements is carried out on an assembly line. The trim panels are advanced by means of conveyors underneath guides. The base strips are brought into engagement with the guides and are advanced through them, thereby aligning the base strips with great accuracy on the desired portion of the trim panels. As the base strips and the trim panels are continuously advanced, the base strips pass beneath a stapling device, or equivalent securing means, which locks the base strips to the trim panels. As the trim panel with the now permanently attached base strip advances further along the assembly line, the operator places the cover strip in registering relation over the base strip. Preferably the cover strip is formed so as to have a light snap-on engagement with the base strip. As the assembly continues to advance, the cover strip passes beneath a roller which is adapted to force the cover strip firmly down over the base strip. Immediately afterwards the cover strip passes past one, or between two or more oppositely directed rollers having flanges formed thereon which are adapted to force and permanently bend the flanges of the cover strip underneath the laterally extending flanges of the base strip, so as to provide a permanent and positive interlock.

With the foregoing general description in mind, it is an object of the invention to provide, in apparatus of the character described, a stapling device adapted to staple base strips to a trim panel while the same continuously advances.

It is a further object of the invention to provide, in apparatus of the character described, a stapling device which is mounted for limited movement with a conveyor system, so that the stapling may be carried out in an aforesaid manner without interrupting advance of the articles on the conveyor.

Other objects of the invention will be apparent as the description proceeds, and when taken in conjunction with the accompanying drawings, wherein:

Figure 1 is a fragmentary side elevation of the apparatus employed;

Figure 2 is a vertical cross sectional view through the structure in Figure 1;

Figure 3 is a fragmentary end view, looking to the left in Figure 2;

Figure 4 is a detail view of one of the pressure rollers and associated parts;

Figure 5 is a fragmentary plan view of a portion of the stapling mechanism;

Figure 13 is a wiring diagram indicating the electrical connection between the switches and the solenoid.

Figure 6:
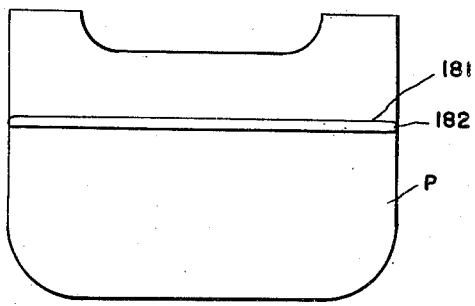
Figure 6 is an elevation of a trim panel provided with the decorative molding of the type described.
Figure 7:
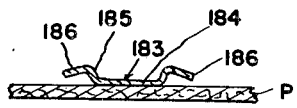
Figure 7 is a vertical cross sectional view through a trim panel and base strip before being stapled together.

The apparatus which I employ for assembling the molding strips on the trim panels includes an elongated table 10 supported by a plurality of legs 11.

Carried by the table 10, adjacent the ends thereof, are sprockets 13 over which passes a chain 15 adapted to engage the underside of a trim panel P.

In order to rigidly support the upper run of the chain in a horizontal plane, I provide a track member 20 which runs the entire length of the table and which includes a bar 21 upon which rollers 22 are adapted to ride.

The chain 15 is provided at each side of the table and is adapted to engage the trim panels fed along adjacent the edges thereof.

In order to force the trim panels positively into engagement with the chain, I provide a plurality of pressure rollers 25, which are engageable with the upper side of the trim panels and cause the latter to be firmly engaged with and positively advanced by the chain 15.

Referring particularly to Figure 4, the roller 25 is mounted on a link 30 which, in turn, is pivoted to a bracket 31, as indicated at 32. The link 30 has at one end an upstanding arm 33 provided with a centering stud 34. Secured to the frame of the machine is a cooperating member 35 having a second centering stud 36. A compression spring 37 is sleeved on the studs 34 and 36 and urges the roller 25 downwardly into engagement with the upper surface of each trim panel adjacent the edges thereof. In order to prevent downward movement of the roller 25 beyond a predetermined point, the link 30 is provided with an adjustable stop bolt 38, which is adapted to engage a portion of the supporting angle iron 39, as seen in Figure 4.

Any suitable means (not shown) such as a motor and speed reducer assembly may be operatively connected to the shaft 50 for one of the sprockets 13 to drive the chain 15.

The mechanism which staples the base portions of the molding strips to the trim panels is illustrated in Figures 1, 2 and 5, to which attention is now directed. As seen in Figures 1 and 2, I provide a guide 80 for the base portions 183 of the molding strips. Preferably this guide 80 is carried by a bracket 81 that is adjustable transversely of the conveyor in a slot 82 formed in a supporting bar 83. This permits adjustment of the guide 80 so as to apply the base strip to the location desired upon the trim panel. Directly beneath the guide 80 is a roller 84 (Figure 1) mounted on a member 85 pivoted to a supporting bracket 86, as indicated at 87. A compression spring 88 is located between a stud 89 formed on the member 85 and a stud 90 formed on the bracket 86, and biases the roller 84 upwardly into engagement with the underside of the trim panels P. Upward movement of the roller 84 under the influence of the spring 88 is limited by an adjustable stop bolt 91 carried by the bracket 86 and engageable with the member 85. The bracket 86 is adjustable lengthwise of a transversely extending bar 95 (Figures 1 and 2), suitable means for this purpose being indicated generally at 92, and including a clamping plate 93 and clamping bolt 94 adapted to lock bracket 86 in adjusted position relative to said bar 95 when the clamping bolt is tightened.

The underside of the guide 80 has an inverted channel shaped recess 80a, as indicated by dotted lines in Figures 1 and 2 for directing the base strips 183 properly relative to the trim panels P as they advance. Preferably the receiving end of the inverted channel 80a is flared to facilitate insertion of the base strips with said channel, while the base of the inverted channel inclines downwardly from the receiving end thereof toward its other end.

The stapler actually employed (Fig. 2) in the present machine is a Morrison model S. J. F., hence details thereof are not shown in the present application. This stapling device has an anvil arm 101 which extends under the trim panel and an over-arm 102 which extends over the trim panel and carries the stapling head 100 in registry with the anvil arm 101. The anvil arm 101 carries an anvil 103, as seen in Figure 1. The stapling head carries a supply of wire, and has a downwardly movable portion which serves a length of wire and drives the same through the article being stitched or stapled. The free ends of the wire, as they penetrate through the article, engage the anvil 103 which clamps them in place.

In order to actuate the stapler, we provide a solenoid 105 (Figures 1 and 2) having a plunger 106 connected by a link 107 to a lever 108, pivoted at 109 to a bracket 110. Solenoid 105 is supported on a plate 111, which is secured in depending relation to an adjustable slide 112 (Figures 1, 2 and 5). The bracket 110 is also secured to the slide 112 so that the parts may all be adjusted simultaneously. Lever 108 has secured thereto a link 113 which is pivotally secured to an operating rod 114, as indicated generally at 115. Upon actuation of the solenoid 105 the plunger 106 moves downwardly, thus moving the operating rod 114 downwardly and effecting a stapling operation. Suitable controls 140 and 141, respectively, are provided for actuating the solenoid at predetermined intervals during passage of a trim panel past the stapling head.

The Morrison stapler includes a motor (not shown) and a clutch 210 for conecting the motor to the mechanism in the stapling head 100. The arrangement is such that when the clutch is engaged, the driven shaft makes one revolution and affixes one staple and stops. Thus, each time the solenoid 105 is energized and the operating rod 114 is depressed, the driven shaft of the stapling device is driven through the clutch 210 for one revolution.

The motor (not shown) is connected to the operating shaft, which is indicated at 211, through a drive gear 212.

Referring now more particularly to Figure 5, I illustrate means for adjusting the stapling mechanism transversely of the table so as to provide for attachment of the molding strips at any point on the trim panel. This means comprises a framework indicated generally at 120, including spaced parallel bars 121 and 122 on which is mounted the slide 112. The bars 121 and 122 are mounted on angle irons 123 and 124, (Fig. 1) respectively, and provide ways in which the slide 112 is adjustable. Means are provided for adjusting the slide 112 transversely, and comprises a feed screw 125 journaled in a cross piece 126 at the ends of bars 121 and 122. A hand operated crank 127 is provided, and the feed screw 125 has threaded engagement with a depending element 128 carried by slide 112.

As previously stated, the slide 112 carries the solenoid 105 and the bracket 110, so that adjustment of the slide 112 transversely does not affect the operating relationship of these parts.

It is desirable to advance the panels continuously past the stapling mechanism hence means is provided to permit stapling of the trim panels during movement thereof. This means comprises a swivel plate 130 which is pivoted to the slide 112 at the center line of a stud 131. The stapling elements 100, 101 and 102 are mounted on the swivel plate 130 for movement therewith. Intermediate the slide 112 and swivel plate 130, I provide suitable bearings indicated in Figure 2 at 132. I have indicated the center line of the stapling and molding at 135, and it will be observed that this is removed a suitable distance from the pivot center of the swivel plate 130. Since the stapling head 100 is in engagement with the trim panel P during only a very short interval of time, the arc of movement of the stapling head during engagement of the trim panel is substantially a straight line. In order to permit the necessary relative movement between the parts brought about by the movement of the stapling head in contact with the trim panel, such of the connections as are affected, are made with a loose or "sloppy" fit.

As best seen in Figure 5, the swivel plate 130 is provided with an abutment 136, which is adapted to engage an adjustable abutment 137 mounted on the slide 112. The slide 112 also carries a pin 138 to which is secured one end of a tension spring 139, the other end being secured, as shown, to the abutment 136. The spring 139 therefore biases the swivel plate 130 to its normal or initial position, and returns the same to initial position at the completion of each stapling operation.

To insure positive motion of the swivel plate 130 during the stapling operation, the following structure is provided. Referring to Figures 2 and 3, a bracket 215 is affixed to the slide 112 and is provided adjacent its top with a roller 216. Keyed or otherwise secured to the shaft 211 of the stapler is an eccentric cam 218. As previously stated, the shaft 211 is adapted to make one revolution during each stapling operation and, accordingly, the cam 218 similarly makes one complete revolution during each stapling operation. As seen in Figure 3 the roller 216 is in engagement with the periphery of the cam 218. The cam 218 is rotated in the direction of the arrow 219. Since the stapling mechanism is mounted on the swivel plate 130, and the bracket 215 carrying the roller 216 is fixed to the slide 112 it will be apparent that rotation of the cam 218 will cause the stapling head 100 and swivel plate 130 to move as a unit in substantial parallelism and at the same speed as the advancing trim panel. During the stapling operation the swivel plate 130 is returned to initial position by the spring 139, as previously described.

As best seen in Figure 1, I provide adjacent the path of travel of the trim panels P a plurality of electric switches 140, 141, which are adjustable lengthwise of a rail 142. These switches are arranged in a circuit with the solenoid 105 which actuates the stapling mechanism. The arrangement may be varied as desired, but in the present embodiment the switches 140 and 141 are so connected to the solenoid that initiation of the stapling operation takes place when the leading edge of one trim panel engages and swings to the left the trip arm 140' of switch 140, and the stapling operation continues by suitable timing means (not shown) until the trailing edge of the trim panel passes over the trip arm 141' of switch 141. This provides for initiation of the stapling operation after the leading edge of the trim panel has passed the stapling station, and provides for termination of the stapling operation before the trailing edge of the trim panel passes the stapling station.

As the trim panels advance past the stapler, they are carried for a suitable distance along the conveyor in exposed condition. At this time the operator takes the cover strips 190 (Figs. 7–11) and places them over the base strips 183, which are now securely locked by stapling or wire stitching to the trim panels. As previously stated, these cover strips are preferably so formed as to have a light snap-on engagement with the base strips, although this is not strictly necessary. The cover strips are complete in that their ends are formed and closed to the desired configuration, which would prevent sliding a cover strip on from one end of a base strip.

Figure 8:
Figure 8 is a view similar to Figure 7 after the parts have been stapled together.

In Figure 8 I have shown the base strip 183 secured to the trim panel P by suitable means such as wire staples or stitches 187.

Figure 9:
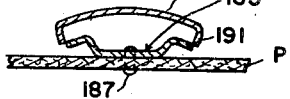
Figure 9 is a vertical cross sectional view through an assembled trim panel and base strip and showing the initial position of a cover strip relative to the base strip.
Figure 10:
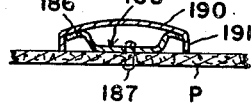
Figure 10 is a view similar to Figure 9 after the cover strip has been pressed down over the base strip.
Figure 11:
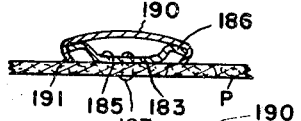
Figure 11 is a view similar to Figure 9 after the side flanges of the cover strip have been pressed inwardly beneath the outwardly projecting lateral flanges of the base strip.

In Figure 9 the cover strip 190 is in its initial position on the base strip 183. As previously stated, the cover strip 190 is provided with downwardly and slightly inwardly inclined flanges 191, the arrangement being such with relation to the flange portions 186 of the base strip 183 that the cover strip 190 has a light snap-on engagement therewith. It is only necessary to provide a temporary inter-engagement between these parts, pending the subsequent provision of the permanent interlock. The operator may if desired force the cover strip 190 downwardly, as shown in Figure 10, or this operation may if desired be performed by one or more rollers (not shown). The next step in the operation is the bending or rolling of the flanges 191, at least partially under the flange portions 186 of the base strip 183. Figure 11 shows the arrangement of molding elements after this step has been completed.

Figure 12:
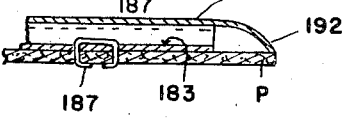
Figure 12 is a fragmentary section through one end of the molding strip, illustrating this construction.

In Figure 12 I have indicated a fragmentary longitudinal section through a molding strip made in accordance with the present invention. In this figure the trim panel P has the base strip 183 stapled thereto, as indicated at 187, and the cover strip 190 is secured in place. As seen in Figure 12, the cover strip 190 has its end rounded off and closed, as indicated by the numeral 192.

By practicing the present invention it is possible to employ a base strip of a relatively inexpensive material, and to employ a light gauge cover strip formed of a more expensive metal if desired. At the same time, it will be appreciated that the cover strip need not necessarily be of metal, but need only be of a sheet material which is adapted to take a permanent set as a result of the molding operation. Thus for example, cover strips formed from certain plastics are suitable.

What I claim as my invention is:

1. In apparatus of the character described, a conveyor, a slide adjustable transversely of said conveyor, a swivel plate pivoted to said slide, a stapling device secured to said swivel plate, said stapling device having a stapling head located remote from the pivot axis of said swivel plate whereby said stapling head moves along said conveyor while engaged with articles carried thereby, and resilient means for returning said swivel plate to initial position when said stapling head becomes disengaged from said articles.

2. In apparatus of the character described, a conveyor, a slide adjustable transversely of said conveyor, a stapling device including a stapling head on said slide, means mounting said stapling device to permit limited movement of said stapling head along said conveyor while engaged with articles thereon, and resilient means returning said stapling head to initial position when disengaged from said articles.

3. In apparatus of the character described, a conveyor for continuously advancing a series of trim panels, a stapling head over said conveyor having limited movement along said conveyor from an initial position, resilient means urging said head toward initial position, and a guide over said conveyor in alignment with said stapling head, said guide having a tapered recess in its underside adapted to align a rigid strip with said stapling head and to press the strip into firm contact with the upper surface of an article on said conveyor to facilitate the stapling operation.

4. In apparatus of the character described, a continuously moving conveyor for advancing trim panels, a device for stapling base strips to the advancing panels, means mounting said stapling device for limited movement in two directions over said conveyor, said stapling device including a shaft adapted to have predetermined rotation during each stapling operation, cam means operable by rotation of said shaft for moving said stapling device in one direction over said conveyor while it engages the base strips being stapled, and resilient means operable after a stapling operation for moving said stapling device in the other direction over said conveyor.

5. In apparatus of the character described, a continuously moving conveyor for advancing articles to be stapled, a stapling device, means mounting said stapling device for limited movement along said conveyor, said stapling device including a shaft adapted to have predetermined rotation during each stapling operation, cam means operable by rotation of said shaft for moving said stapling device along said conveyor while it engages the article being stapled, and resilient means to return said stapling device between succeeding operations.

6. In apparatus of the character described, a conveyor for advancing trim panels, a device for stapling base strips to the advancing panels, transversely extending frame members above and below said conveyor, adjustable means carried by the upper frame member for guiding on the trim panels the base strips to be stapled thereto, and adjustable spring pressed means carried by the lower frame member for maintaining the trim panels in proper relation to the guiding means.

7. In apparatus of the character described, a conveyor for advancing trim panels, a device for stapling base strips to the advancing panels, transversely extending frame members above and below said conveyor, means adjustable lengthwise of the upper frame member for guiding on the trim panels the base strips to be stapled thereto, and spring pressed means adjustable lengthwise of the lower frame member for maintaining the trim panels in proper relation to the guiding means.

8. In apparatus of the character described, a conveyor for a trim panel, mechanism for stapling a base strip to a trim panel on said conveyor, a slide movable transversely of said conveyor, a swivel mounting for the stapling mechanism carried by said slide, and means for adjusting said slide transversely of said conveyor to vary the position of the stapling mechanism relative to a trim panel on the conveyor.

9. In apparatus of the character described, a conveyor for a trim panel, mechanism for stapling a base strip to a trim panel on said conveyor, a swivel mounting for said mechanism, and means for adjusting said mounting transversely of said conveyor to vary the position of the stapling mechanism relative to a trim panel on the conveyor.

10. In apparatus of the character described, a conveyor for trim panels, mechanism for stapling a base strip to a trim panel on said conveyor, a slide movable transversely of said conveyor, and a swivel mounting for said stapling mechanism carried by said slide.

11. In apparatus of the character described, a conveyor for trim panels, mechanism for stapling a base strip to a trim panel on said conveyor, a slide movable transversely of said conveyor, a swivel mounting for said stapling mechanism carried by said slide, and cam means for moving said stapling mechanism on said swivel mounting with the trim panels on said conveyor.

12. In apparatus of the character described, a conveyor for trim panels, mechanism for stapling a base strip to a trim panel on said conveyor, a slide movable transversely of said conveyor, a swivel mounting for said stapling mechanism carried by said slide, and means operable during operation of the stapling mechanism for moving said mechanism on said swivel mounting with the trim panels on said conveyor.

13. In apparatus of the character described, a conveyor for trim panels, mechanism for stapling a base strip to a trim panel on said conveyor, a slide movable transversely of said conveyor, a swivel mounting for said stapling mechanism on said slide, and means for moving the stapling mechanism on said swivel mounting.

14. In apparatus of the character described, a conveyor for trim panels, mechanism for stapling a base strip to a trim panel on said conveyor, a slide movable transversely of said conveyor, a swivel plate for said stapling mechanism on said slide, an adjustable abutment for said swivel plate, cam actuated means for moving said swivel plate away from said abutment, and spring means for returning said swivel plate to said abutment.

15. In apparatus of the character described, a conveyor for trim panels, mechanism for stapling a base strip to a trim panel on said conveyor, a slide movable transversely of said conveyor, a swivel mounting for said stapling mechanism on said slide, an operating shaft for said stapling mechanism, a cam on said shaft, and means actuable by said cam for moving the stapling mechanism on said swivel mounting.

16. In apparatus of the character described, a conveyor for advancing trim panels, a device for stapling base strips to the advancing trim panels, brackets located above and below the conveyor and adjustable relative thereto, a guide for the base strips to be stapled carried by one of said brackets, and a spring pressed element carried by the other of said brackets for pressing the advancing trim panels into operative relation to the guide.

17. In apparatus of the character described, a conveyor for advancing trim panels, a device for stapling base strips to the advancing trim panels, a bracket adjustable transversely of said conveyor, a guide for the base strips carried by said bracket, said guide having an inverted channel for directing the base strips to be stapled over the trim panels, the channel having a flaring end for receiving the base strips, the base of the inverted channel inclining downwardly from the flared receiving end toward the other end of the channel for pressing the base strips into operative relation with the trim panels to facilitate the stapling operation.

18. In apparatus of the character described, a conveyor for advancing trim panels, a device for stapling base strips to the advancing trim panels, a solenoid for controlling actuation of the stapling device, electric switches having trip arms for actuating the same, said trip arms being in the path of travel of and engageable by the trim panels during advancement thereof whereby said arms will be actuated by said trim panels, said switches being adjustable lengthwise of the path of travel of the trim panels and operatively connected to said solenoid.

19. In apparatus of the character described, a conveyor for advancing trim panels, a device for stapling base strips to the advancing trim panels, a solenoid for controlling actuation of the stapling device, and electric switches having trip arms for actuating the same, said trip arms being in the path of and engageable by the trim panels, said switches being operatively connected to said solenoid.

20. In apparatus of the character described, a conveyor for advancing trim panels, a device for stapling base strips to the advancing trim panels, a transversely extending supporting bar above said conveyor, a bracket adjustable lengthwise of said supporting bar, a guide for the base strips to be stapled carried by said bracket, a transversely extending bar beneath said conveyor, a bracket carried by the last mentioned bar, and spring actuated means carried by the last mentioned bracket for pressing the advancing trim panels into operative relation with said guide.

21. In apparatus of the character described, a conveyor for advancing trim panels, a device for stapling base strips to the advancing trim panels, a supporting member above said conveyor, a bracket carried by and adjustable relative to said supporting member, a guide for the base strips to be stapled carried by said bracket, a supporting member beneath said conveyor, a bracket carried by and adjustable relative to the last mentioned member, and means carried by the last mentioned bracket for pressing the advancing trim panels into operative relation with said guide.

22. In apparatus of the character described, a conveyor for advancing trim panels, a device for stapling base strips to the advancing trim panels, a slide movable transversely of said conveyor, a bracket carried by said slide, a solenoid carried by said slide, and means actuable by said solenoid for operating said stapling device including a lever carried by said bracket.

23. In apparatus of the character described, a conveyor for advancing trim panels, a device for stapling base strips to the advancing trim panels, an adjustable slide, a bracket carried by said slide, a solenoid carried by said slide and having a plunger, a lever carried by said bracket and operatively connected to said plunger, and means actuable by said lever for operating said stapling device.

24. In apparatus of the character described, a conveyor for advancing trim panels, an adjustable slide, a swivel plate carried by said slide, a device carried by the swivel plate for stapling base strips to the advancing trim panels, and means carried by the slide for operating the stapling device.

25. In apparatus of the character described, a conveyor for advancing trim panels, an adjustable slide, a swivel plate carried by said slide, a device carried by the swivel plate for stapling base strips to the advancing trim panels, means carried by the slide for operating the stapling device, an adjustable abutment for the swivel plate carried by the slide, and yieldable means normally holding the swivel plate in engagement with said abutment.

26. In apparatus of the character described, a conveyor for advancing trim panels, an adjustable slide, a swivel plate carried by said slide, a device carried by the swivel plate for stapling base strips to the advancing trim panels, said stapling device having a drive shaft, a bracket carried by the slide, and means for actuating the swivel plate relative to said conveyor, including a cam on said shaft, and a roller carried by said bracket and engaging said cam.

ALVIN C. LIND.